(12) United States Patent
Taylor et al.

(10) Patent No.: US 10,518,207 B2
(45) Date of Patent: Dec. 31, 2019

(54) AUTOMATIC AIR FILTER WITH ENHANCED AIR FLOW FILTERING AREA

(71) Applicant: AUTOMATIC AIR, LLC, Calexico, CA (US)

(72) Inventors: James Eric Taylor, El Centro, CA (US); Scott Edward Morehouse, El Centro, CA (US)

(73) Assignee: Automatic Air, LLC, Calexico, CA (US)

( * ) Notice: Subject to any disclaimer, the term of this patent is extended or adjusted under 35 U.S.C. 154(b) by 399 days.

(21) Appl. No.: 15/332,901

(22) Filed: Oct. 24, 2016

(65) Prior Publication Data

US 2018/0111077 A1    Apr. 26, 2018
US 2018/0296960 A9    Oct. 18, 2018

(51) Int. Cl.
*B01D 46/20* (2006.01)
*B01D 46/18* (2006.01)
*B01D 46/40* (2006.01)

(52) U.S. Cl.
CPC .................. *B01D 46/185* (2013.01)

(58) Field of Classification Search
CPC ...... B01D 46/032; B01D 46/20; B01D 46/18; B01D 46/40; B01D 46/185; B01D 46/0086
USPC ........................... 55/351–354, 470, 500, 521
See application file for complete search history.

(56) References Cited

U.S. PATENT DOCUMENTS

| | | | | |
|---|---|---|---|---|
| 1,456,360 | A * | 5/1923 | Budil | B01D 46/02 55/484 |
| 1,982,639 | A * | 12/1934 | Christofferson | B01D 46/18 210/387 |
| 2,966,959 | A * | 1/1961 | Gerhard | B01D 46/125 55/484 |
| 3,019,855 | A * | 2/1962 | Engle | B01D 46/18 210/111 |
| 3,800,509 | A * | 4/1974 | Carr | B03C 3/155 55/352 |
| 3,853,510 | A * | 12/1974 | Meyer | B01D 46/02 55/368 |
| 4,154,587 | A * | 5/1979 | Gerok | B01D 46/06 55/381 |
| 4,378,980 | A * | 4/1983 | Long | B01D 46/0032 55/354 |
| 6,128,910 | A | 10/2000 | Faircloth | |
| 6,402,822 | B1 * | 6/2002 | Najm | B01D 46/0086 55/351 |
| 8,313,567 | B2 * | 11/2012 | Sullivan | B01D 46/18 55/351 |
| 8,591,616 | B2 * | 11/2013 | Sullivan | B01D 46/0054 55/351 |

\* cited by examiner

*Primary Examiner* — Minh Chau T Pham
(74) *Attorney, Agent, or Firm* — Nydegger & Associates

(57) ABSTRACT

An air filter system in accordance with the present invention includes a filter housing that defines an airflow channel. A supply roll of a filter medium, and a take-up roll for receiving the filter medium from the supply roll are positioned parallel to each other in the airflow channel. A plurality of wire mesh diverter-screens are positioned between the supply roll and the take-up roll to establish a tortuous path for statically positioning the filter medium across the airflow channel. Periodically, the take-up roll can be rotated to draw replacement filter medium into position on the tortuous path.

19 Claims, 2 Drawing Sheets

AUTOMATIC AIR FILTER WITH ENHANCED AIR FLOW FILTERING AREA

FIELD OF THE INVENTION

The present invention pertains generally to air filters which are used in the ducting of a Heat-Ventilation-Air-Conditioning (HVAC) system. More particularly, the present invention pertains to air filter systems which position a filter medium on a tortuous path through a predetermined space in an airflow channel of an HVAC system. The present invention is particularly, but not exclusively, useful as an air filter system for periodically moving replacement filter medium into the airflow channel at predetermined intervals.

BACKGROUND OF THE INVENTION

The use of air filters in Heating-Ventilating-Air-Conditioning (HVAC) systems have at least two beneficial purposes. For one, they improve the efficiency of the HVAC system by removing airborne contaminants from the air that that would otherwise flow with the air through components of the HVAC system. Specifically, as is well known, airborne contaminants are a major contributor for adversely affecting the operational efficacy of an HVAC system. The other purpose for using an air filter in an HVAC system is to improve the air quality in the environment that is being serviced by the system.

It is well known that over time, air filters become dirty and less efficient. Thus, in order to maintain an acceptable level of filter efficacy it is expected, and is indeed necessary, to periodically replace air filters. It is also known that the efficiency of an air filter can be improved, and their replacement times extended, by increasing the air filter surface that is exposed to the column of air which is being filtered. One way to do this is by orienting the air filter with its exposed surface at an angle to the direction of air flow.

In light of the above, it is an object of the present invention to provide an air filter for use in a Heating-Ventilating-Air-Conditioning (HVAC) system that establishes a tortuous path for a filter medium, to thereby increase the surface area of the filter medium across the airflow channel for filtering air as the air moves through the airflow channel. Another object of the present invention is to provide an air filter for use in a Heating-Ventilating-Air-Conditioning (HVAC) system which automatically replaces used filter medium with new, unused filter medium in accordance with a predetermined schedule, by periodically rotating a take-up roll to advance the filter medium from a supply roll to the take-up roll along the tortuous path. Still another object of the present invention is to provide an air filter system for use in a Heating-Ventilating-Air-Conditioning (HVAC) system which is easy to manufacture and install, is simple to operate, and is relatively cost effective.

SUMMARY OF THE INVENTION

An air filter system in accordance with the present invention, which is intended for use in a Heating-Ventilating-Air-Conditioning (HVAC) system, includes a filter housing which can be appropriately positioned in the ducting of a Heating-Ventilating-Air-Conditioning (HVAC) system. Structurally, the filter housing defines an airflow channel and a filter plane. In particular, when the filter housing is positioned in the HVAC system, the filter plane is oriented perpendicular to the direction of air flowing through the airflow channel that is defined by the filter housing.

In combination, the filter housing supports a supply roll of a filter medium, and the supply roll is mounted in the airflow channel of the filter housing for rotation around a first axis. The filter housing also supports a take-up roll that is mounted on the filter housing in the airflow channel for rotation around a second axis. In this combination, the first axis of the supply roll and the second axis of the take-up roll are parallel and spaced apart from each other. Additionally, a pair of removable diverter-screens is mounted on the filter housing in the airflow channel between the supply roll and the take-up roll. Specifically, this is done to establish a tortuous path for the filter medium as it passes around the diverter-screens and crosses back and forth through the filter plane in the airflow channel. However, because the removable diverter-screens have a wire mesh screen construction, they do not impair or impede the flow of air through the filter medium in the air flow channel.

For an operation of the present invention, the take-up roll is connected with the filter medium to receive and collect the filter medium from the supply roll. The diverter-screens are then engaged with the filter housing to establish a tortuous path, which provides an enhanced (i.e. increased) surface area of filter medium across the airflow channel, for filtering air as it moves through the airflow channel defined by the filter housing. A motor, which is connected with the take-up roll, can then be periodically activated to rotate the take-up roll and thereby advance the filter medium from the supply roll to the take-up roll along the tortuous path.

In detail, each diverter-screen for the present invention preferably includes a wire mesh that is formed as a wedge having a rectangular spreader and a pair of panels. The panels respectively extend from opposed edges of the spreader for intersection at an apex line, wherein the apex line is distanced from the spreader and is equidistant from the opposed edges of the spreader. Also, a roller is mounted on each diverter-screen along its respective apex line, and each diverter-screen includes a pair of end plates. For a diverter-screen of the present invention, each end plate is affixed to the wire mesh wedge, with the wire mesh wedge positioned between the end plates. Further, a fastener is positioned on a respective end plate for engaging the diverter-screen to the filter housing in the air flow channel.

For operational purposes, the diverter-screens are mounted on the filter housing in sequence as a first diverter-screen and a second diverter-screen. In this combination, their respective spreaders are coplanar and their respective apex lines are coplanar. Accordingly, the tortuous path is established to sequentially pass around the diverter-screens, and to cross back and forth through the filter plane. In detail, the tortuous path is established to position the filter medium against one panel of the first diverter-screen, then over the roller at the apex line of the first diverter-screen, and subsequently against the other panel of the first diverter-screen. The filter medium is then transferred from the first diverter-screen to the second diverter-screen where it is likewise positioned against the panels and over the roller of the second diverter-screen in the sequence. As disclosed above, this is accomplished automatically in accordance with a predetermined time schedule. Once a supply roll of the filter medium has been used up, it is replaced for continued operation of the air filter system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
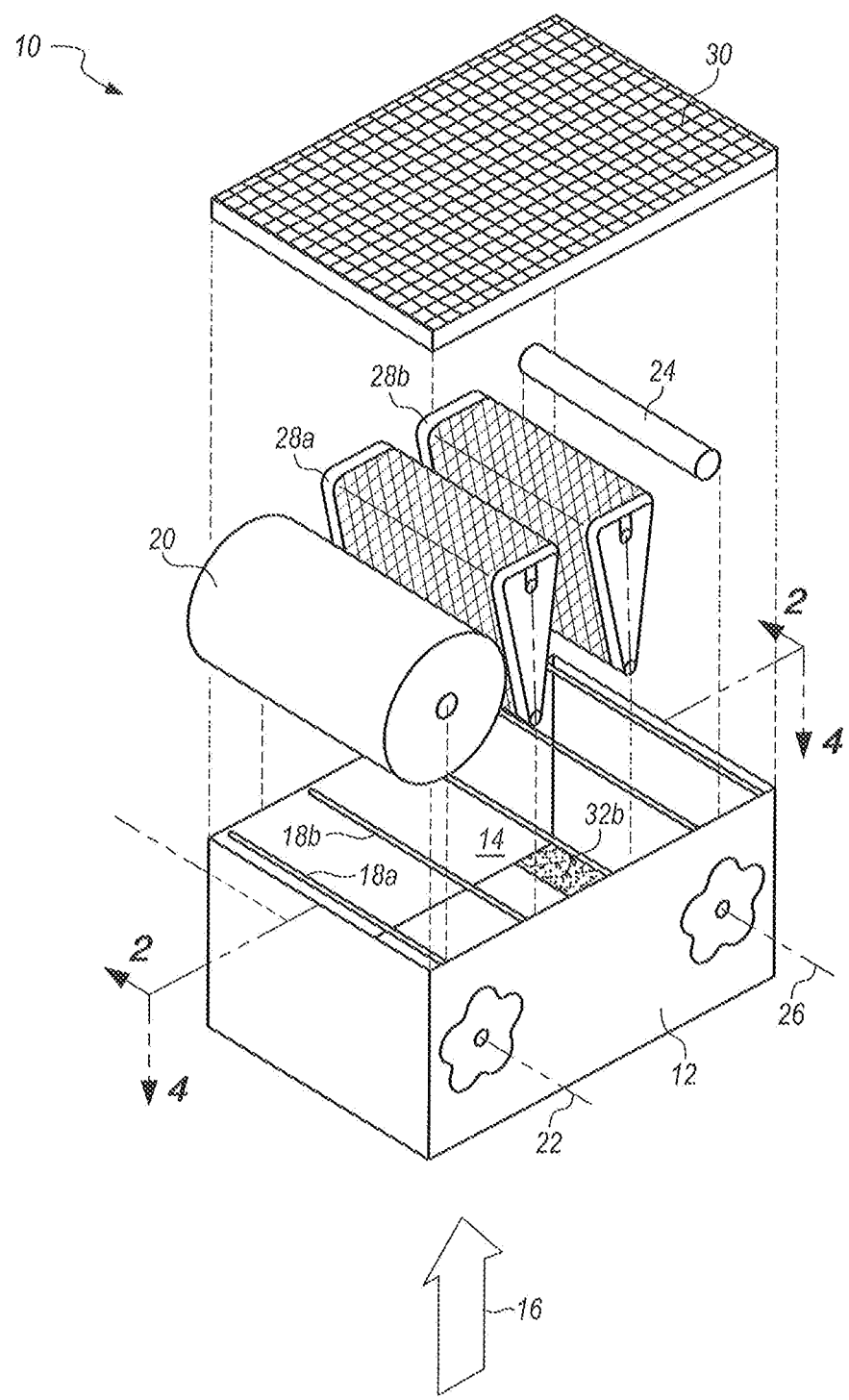
FIG. 1 is an exploded perspective view of an air filter system in accordance with the present invention.

Referring initially to FIG. 1 an air filter in accordance with the present invention is shown and is generally designated 10. As shown, the air filter 10 includes a filter housing 12 which defines an air flow channel 14. Further, as shown, the filter housing 12 is configured to direct air flow through the air flow channel 14 of the housing 12 in the direction indicated by the arrow 16.

Further, the air filter 10 also includes a plurality of guide rollers 18a-e of which the guide rollers 18a and 8b are identified in FIG. 1. Collectively, the guide rollers 18a-e are mounted on the filter housing 12 (see FIG. 2); they are mutually parallel to each other; and they are all oriented perpendicular to the direction of air flow (arrow 16) through the air flow channel 14.

FIG. 1 also shows that the air filter 10 includes a supply roller 20 which includes a filter medium, and that the supply roller 20 is mounted on the filter housing 12 for rotation around an axis 22. Similarly, a take-up roller 24 is provided for the air filter 10, and it is mounted on the filter housing 12 for rotation around an axis 26. In accordance with disclosure below, the filter medium is advanced from the supply roller 20 to the take-up roller 24 during an operation of the present invention. Preferably, the filter medium is a cloth like material of a type well known in the pertinent art, such as non-woven polypropylene or fiberglass mesh.

Figure 2:
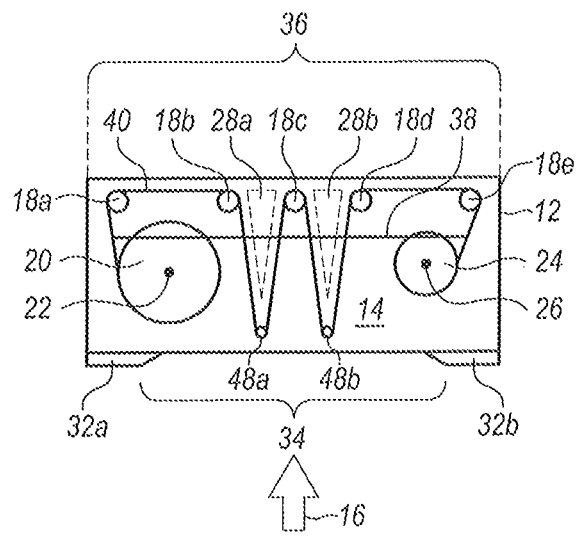
FIG. 2 is a cross-section view of an assembled air filter system as would be seen along the line 2-2 in FIG. 1.

Still referring to FIG. 1, it will be seen that a pair of diverter-screens 28a and 28b are included in the air filter 10. Importantly, as more fully disclosed below, the diverter-screens 28a and 28b cooperate in combination with the guide rollers 18a-e to direct the filter medium through the filter housing 12 from the supply roller 20 to the take-up roller 24. Also, a grating 30, which is made of a wire mesh material, is provided to enclose the above disclosed components within the filter housing 12 when the air filter 10 is assembled. Referring now to FIG. 2, it will be appreciated that the filter housing 12 includes a pair of opposed baffles 32a,b. Structurally, the baffles 32a,b admit air entering the air flow channel 14 through a narrowed entry 34. Thus, the initial flow of air into the air flow channel 14 is directed between the supply roller 20 and the take-up roller 24. Air will then leave the air flow channel 14 through a relatively wider exit 36.

For reference purposes, FIG. 2 also shows that the filter housing 12 defines a filter plane 38 which is oriented within the air flow channel 14. Importantly, it is to be appreciated that the filter plane 38 is oriented in the air flow channel 14 perpendicular to the direction of air flow (arrow 16) that is flowing through the air flow channel 14. FIG. 2 also shows that the plurality of guide rollers 18a-e, in combination with the pair of diverter-screens 28a,b, cooperate with each other to establish a tortuous path 40 for the filter medium, when the filter medium is exposed between the supply roller 20 and the take-up roller 24. In particular, it is an important aspect of the present invention that as the filter medium is advanced through the air flow channel 14, it will travel on the tortuous path 40, back and forth across the filter plane 38 between the supply roller 20 and the take-up roller 24 inside the filter housing 12.

Figure 3:
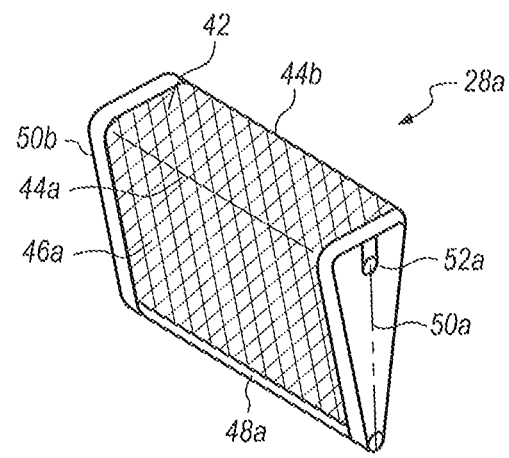
FIG. 3 is a perspective view of a diverter-screen of the present invention.

In FIG. 3 a diverter-screen which is generally designated 28a, is shown to include a spreader 42 that is bounded by parallel, opposed edges 44a and 44b. A panel 46a is also shown which extends from the edge 44a to a roller 48a. Note: an opposed panel 46b, which is not shown, extends from the edge 44b to the roller 48a. Preferably, the spreader 42 and the opposed panels 46a and 46b are made of a porous wire mesh. FIG. 3 also shows that the diverter-screen 28a includes a pair of endplates 50a and 50b for the diverter-screen 28a, which support the spreader 42, the opposed panels 46a and 46b, as well as the roller 48a between them. Additionally, as best appreciated with reference back to FIG. 2, fasteners 52a and 52b (fastener 52b is not shown) are respectively included on each of the endplates 50a and 50b for the purpose of mounting the diverter-screens 28a and 28b onto the filter housing 12.

In detail, the tortuous path 40 that is intended for the present invention is shown in FIG. 2 to initially extend from the supply roller 20 and around the guide rollers 18a and 18b. Tortuous path 40 then continues from guide roller 18b across the filter plane 38 to the roller 48a of diverter-screen 28a. From the roller 48a, tortuous path 40 again crosses the filter plane 38 to the guide roller 18c. At guide roller 18c, tortuous path 40 turns back to again cross the filter plane 38 and it continues around the roller 48b of diverter-screen 28b. From roller 48b, tortuous path 40 turns around the guide rollers 18d and 18e before ending at the take-up roller 24.

Figure 4:
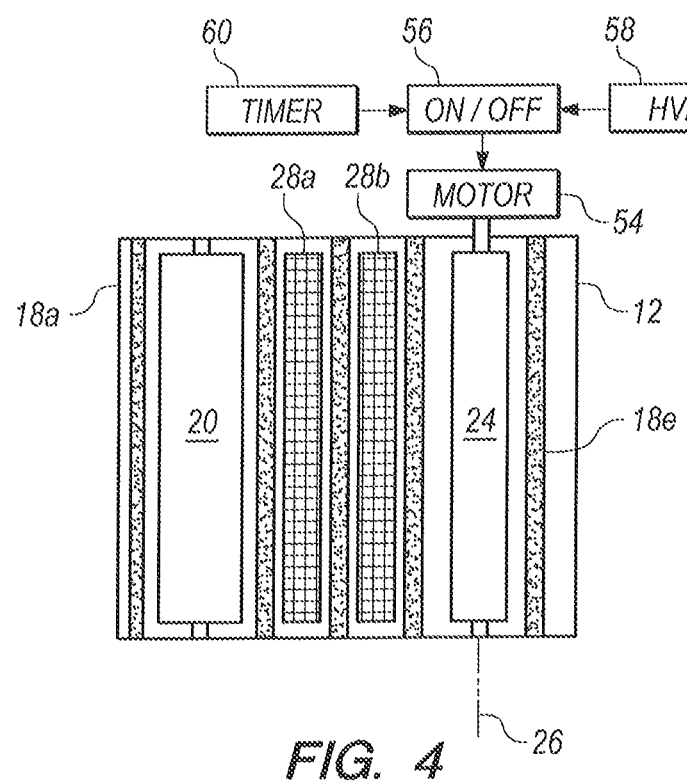
FIG. 4 is a top plan interior view inside the air filter system as would be seen along the 4-4 in FIG. 1.

Turning now to FIG. 4, a motor 54 is shown connected with the take-up roller 24 for rotating the take-up roller 24 around axis 26. As shown, the motor 54 is selectively activated by an ON/OFF switch 56. As intended for the present invention, information from both the HVAC system 58 and from a timer 60 are considered for activation of the ON/OFF switch 56. Specifically, an operation of the motor 54, for rotating the take-up roller 24 to thereby advance the filter medium along the tortuous path 40, is preprogrammed. In detail, the timer 60 can be programmed to replace the filter medium along the b tortuous path 40 according to the requirements of the HVAC system 58 (e.g. at monthly intervals). Moreover, the ON/OFF switch 56 can be programmed to activate the motor 54, only when the HVAC system 58 is idle.

While the particular Automatic Air Filter with Enhanced Air Flow Filtering Area as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:
1. An air filter which comprises:
   a filter housing defining an airflow channel and a filter plane, wherein the airflow channel has a narrowed entry and a relatively wider exit, and wherein the filter plane is oriented perpendicular to the direction of air flowing through the airflow channel of the filter housing;
   a supply roll of a filter medium mounted on the filter housing in the airflow channel for rotation around a first axis;

a take-up roll mounted on the filter housing in the airflow channel for rotation around a second axis, wherein the first axis of the supply roll and the second axis of the take-up roll are parallel and spaced apart from each other, and wherein the take-up roll is connected with the filter medium to receive and collect the filter medium from the supply roll;

a pair of diverter-screens mounted on the filter housing in the airflow channel between the supply roll and the take-up roll to establish a tortuous path for the filter medium, wherein the tortuous path passes around the diverter-screens and crosses back and forth through the filter plane in the airflow channel to provide an enhanced surface area of filter medium across the airflow channel for filtering air as it moves through the airflow channel defined by the filter housing, wherein each diverter-screen is removable and is made of a porous wire mesh; and a motor for periodically rotating the take-up roll to advance the filter medium from the supply roll to the take-up roll, to present a replacement portion of the filter medium along the tortuous path established by the diverter-screens.

2. The air filter recited in claim 1 further comprising a timer for activating the motor in accordance with a predetermined schedule.

3. The air filter recited in claim 2 wherein the air filter is employed in a Heating-Ventilating-Air-Conditioning (HVAC) system and the schedule is established to activate the motor at predetermined intervals while the HVAC system is idle.

4. The air filter recited in claim 1 wherein the tortuous path is configured as a series of pleats.

5. The air filter recited in claim 1 wherein each diverter-screen comprises;

a wedge formed with the porous wire mesh and having a rectangular spreader and a pair of panels, wherein the panels respectively extend from opposed edges of the spreader at an angle relative thereto for intersection at an apex line, wherein the apex line is distanced from the spreader and is equidistant from the opposed edges of the spreader;

a pair of end plates, wherein each end plate is affixed to the wire mesh wedge with the wire mesh wedge positioned therebetween; and a pair of fasteners, with each fastener positioned on a respective end plate for cooperatively engaging the diverter-screen to the filter housing in the air flow channel.

6. The air filter recited in claim 5 further comprising a roller mounted on each diverter-screen along its respective apex line.

7. The air filter recited in claim 6 wherein the diverter-screens are mounted on the filter housing in sequence as a first diverter-screen and a second diverter-screen with their respective spreaders being coplanar and their respective apex lines being coplanar.

8. The air filter recited in claim 7 wherein the tortuous path is established to position the filter medium against one panel of the first diverter-screen, then over the roller at the apex line of the first diverter-screen, and subsequently against the other panel of the first diverter-screen, and further wherein the filter medium is then transferred from the first diverter-screen to the second diverter-screen and is likewise positioned against the panels and over the roller of the second diverter-screen in the sequence.

9. The air filter recited in claim 1 wherein the filter medium is made of non-woven polypropylene or fiberglass mesh.

10. The air filter recited in claim 1 wherein the airflow channel is bounded by a pair of opposed parallel walls and a pair of opposed parallel sides, wherein the sides separate the walls from each other to define a right rectangular cross-section for the airflow channel.

11. An air filter system which comprises:

a filter housing for defining an airflow channel and a filter plane, wherein the airflow channel has a narrowed entry and a relatively wider exit, and wherein the filter plane is oriented perpendicular to the direction of air flowing through the airflow channel;

a plurality of guide rollers and a pair of diverter-screens cooperate in combination to establish a tortuous path in the airflow channel, wherein the tortuous path crosses back and forth through the filter plane in the airflow channel, wherein each diverter-screen is removable and is made of a porous wire mesh; and a take-up roller for periodically advancing a filter medium along the tortuous path to provide an enhanced surface area of filter medium across the airflow channel for filtering air as it moves through the airflow channel.

12. The air filter system recited in claim 11 wherein each diverter-screen comprises:

a wedge formed with the porous wire mesh and having a rectangular spreader and a pair of panels, wherein the panels respectively extend from opposed edges of the spreader for intersection at an apex line, wherein the apex line is distanced from the spreader and is equidistant from the opposed edges of the spreader;

a roller mounted on each diverter-screen along its respective apex line;

a pair of end plates, wherein each end plate is affixed to the wire mesh wedge with the wire mesh wedge positioned therebetween; and a pair of fasteners, with each fastener positioned on a respective end plate for cooperatively engaging the diverter-screen to the filter housing in the air flow channel.

13. The air filter system recited in claim 12 further comprising:

a supply roll of the filter medium mounted on the filter housing in the airflow channel for rotation around a first axis;

a take-up roll mounted on the take-up roller for rotation around a second axis, wherein the first axis of the supply roll and the second axis of the take-up roll are parallel and spaced apart from each other, and wherein the take-up roll is connected with the filter medium to receive and collect filter medium from the supply roll; and a motor for periodically rotating the take-up roll to advance the filter medium from the supply roll to the take-up roll defined by the filter housing.

14. The air filter system recited in claim 13 wherein the diverter-screens are mounted on the filter housing in sequence as a first diverter-screen and a second diverter-screen with their respective spreaders being coplanar and their respective apex lines being coplanar, wherein the tortuous path passes around the diverter-screens to cross back and forth through the filter plane, and wherein the tortuous path is established to position the filter medium against one panel of the first diverter-screen, then over the roller at the apex line of the first diverter-screen, and subsequently against the other panel of the first diverter-screen, and further wherein the filter medium is then transferred from the first diverter-screen to the second diverter-screen and is likewise positioned against the panels and over the roller of the second diverter-screen in the sequence.

15. The air filter system recited in claim 14 further comprising a timer for activating the motor in accordance with a predetermined schedule.

16. The air filter system recited in claim 15 wherein the air filter system is employed in a Heating-Ventilating-Air-Conditioning (HVAC) system and the schedule is established to activate the motor at predetermined intervals, while the HVAC system is idle.

17. A method for employing an air filter system in a Heating-Ventilating-Air-Conditioning (HVAC) system which comprises the steps of;

positioning a filter housing in the ducting of a Heating-Ventilating-Air-Conditioning (HVAC) system, wherein the filter housing defines an airflow channel and a filter plane, wherein the airflow channel has a narrowed entry and a relatively wider exit, and wherein the filter plane is oriented perpendicular to the direction of air flowing through the airflow channel of the filter housing, and the filter housing supports a supply roll of a filter medium mounted on the filter housing in the airflow channel for rotation around a first axis and a take-up roll mounted on the filter housing in the airflow channel for rotation around a second axis, wherein the first axis of the supply roll and the second axis of the take-up roll are parallel and spaced apart from each other, and wherein the take-up roll is connected with the filter medium to receive and collect filter medium from the supply roll, with a pair of diverter-screens mounted on the filter housing in the airflow channel between the supply roll and the take-up roll to establish a tortuous path for the filter medium, wherein the tortuous path passes around the diverter-screens and crosses back and forth through the filter plane in the airflow channel, wherein each diverter-screen is removable and is made of a porous wire mesh; and periodically rotating the take-up roll to advance the filter medium from the supply roll to the take-up roll along the tortuous path to provide an enhanced surface area of filter medium across the airflow channel for filtering air as it moves through the airflow channel defined by the filter housing.

18. The method recited in claim 17 wherein each diverter-screen includes a wedge formed with the porous wire mesh and having a rectangular spreader and a pair of panels, wherein the panels respectively extend from opposed edges of the spreader for intersection at an apex line, wherein the apex line is distanced from the spreader and is equidistant from the opposed edges of the spreader, with a roller mounted on each diverter-screen along its respective apex line, and each diverter-screen also includes a pair of end plates, wherein each end plate is affixed to the wire mesh wedge with the wire mesh wedge positioned therebetween, and a fastener is positioned on a respective end plate for cooperatively engaging the diverter-screen to the filter housing in the air flow channel.

19. The Method recited in claim 18 wherein the diverter-screens are mounted on the filter housing in sequence as a first diverter-screen and a second diverter-screen with their respective spreaders being coplanar and their respective apex lines being coplanar, wherein the tortuous path passes around the diverter-screens to cross back and forth through the filter plane, and wherein the tortuous path is established to position the filter medium against one panel of the first diverter-screen, then over the roller at the apex line of the first diverter-screen, and subsequently against the other panel of the first diverter-screen, and further wherein the filter medium is then transferred from the first diverter-screen to the second diverter-screen and is likewise positioned against the panels and over the roller of the second diverter-screen in the sequence.

* * * * *